US008856519B2

(12) United States Patent
Mullen et al.

(10) Patent No.: US 8,856,519 B2
(45) Date of Patent: Oct. 7, 2014

(54) START METHOD FOR APPLICATION CRYPTOGRAPHIC KEYSTORES

(71) Applicant: International Business Machines Corporation, Armonk, NY (US)

(72) Inventors: Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/869,179

(22) Filed: Apr. 24, 2013

(65) Prior Publication Data

US 2014/0006801 A1    Jan. 2, 2014

Related U.S. Application Data

(63) Continuation of application No. 13/539,325, filed on Jun. 30, 2012, now abandoned.

(51) Int. Cl.
*G06F 21/57* (2013.01)
*G06F 21/72* (2013.01)
*G06F 21/00* (2013.01)

(52) U.S. Cl.
CPC ..................................... *G06F 21/00* (2013.01)
USPC ................................. 713/164; 718/1; 713/189

(58) Field of Classification Search
USPC ........................ 713/164, 189; 718/1
See application file for complete search history.

(56) References Cited

U.S. PATENT DOCUMENTS

| 8,418,174 | B2 * | 4/2013 | Dai et al. ........................... 718/1 |
| 2007/0180509 | A1 | 8/2007 | Swartz et al. |
| 2008/0181399 | A1 | 7/2008 | Weise et al. |
| 2009/0279703 | A1 | 11/2009 | Mclane et al. |
| 2010/0058013 | A1 * | 3/2010 | Gelson et al. .................. 711/162 |
| 2010/0241848 | A1 * | 9/2010 | Smith et al. ................... 713/153 |

FOREIGN PATENT DOCUMENTS

| GB | 2404065 | 1/2005 |
| WO | 9707657 | 3/1997 |
| WO | 2008058055 | 5/2008 |

OTHER PUBLICATIONS

Michael Austin Halcrow, "eCryptfs: An Enterprise-class Cryptographic Filesystem for Linux", International Business Machines, Inc. Proceedings of the Linux Symposium, 2005.

* cited by examiner

*Primary Examiner* — Techane Gergiso
(74) *Attorney, Agent, or Firm* — John D. Flynn; Gregory K. Goshorn; Greg Goshorn, P.C.

(57) ABSTRACT

Provided are techniques for encrypting a resource associated with an application with a first key; generating, at an install time of the application, a first hash code for an executable daemon associated with the application; encrypting the first key with the first hash code to produce a protected first key; generating, at a load time of an application, a second hash code for the executable daemon; deriving the first key by decrypting the protected first key using the second hash code to produce a derived first key; and accessing the resource by the executable daemon by employing the derived first key. Examples of protected resource include, but are not limited to, databases, communication devices and a lightweight directory access protocol server.

25 Claims, 4 Drawing Sheets

START METHOD FOR APPLICATION CRYPTOGRAPHIC KEYSTORES

CROSS-REFERENCES TO RELATED APPLICATIONS

The present application is a continuation and claims the benefit of the filing date of an application entitled, "Start Method for Application Cryptographic Keystores" Ser. No. 13/539,325, filed Jun. 30, 2012, assigned to the assignee of the present application, and herein incorporated by reference.

FIELD OF DISCLOSURE

The claimed subject matter relates generally to computer security and, more specifically, to techniques for ensuring that an encrypted device, service or data can only be accessed by an authorized computer executable.

SUMMARY

Provided are techniques for ensuring that an encrypted device, service or data can only be can only be accessed by an authorized computer executable. One common requirement of information technology (IT) systems is that systems and applications often require the ability to boot or reboot without operator intervention. For example, a database server that accesses encrypted data may suffer a power glitch in the middle of the night. Typically, a system administrator must be available to enter a password or key so that the server may access the data. This requirement is typical in business critical computer systems and applications. In another example, an AIX lightweight directory access protocol (LDAP) uses a password or key to authenticate with a secure LDAP server and AIX provides a file where the unencrypted key is stored until required at boot or restart of the LDAP client daemon. However, to provide a secure system, the file with the unencrypted key should be protected with strong encryption. This presents a chicken and egg problem.

Provided are techniques for encrypting a resource associated with an application with a first key; generating, at an install time of the application, a first hash code for an executable daemon associated with the application; encrypting the first key with the first hash code to produce a protected first key; generating, at a load time of an application, a second hash code for the executable daemon; deriving the first key by decrypting the protected first key using the second hash code to produce a derived first key; and accessing the resource by the executable daemon by employing the derived first key.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

Figure 1:
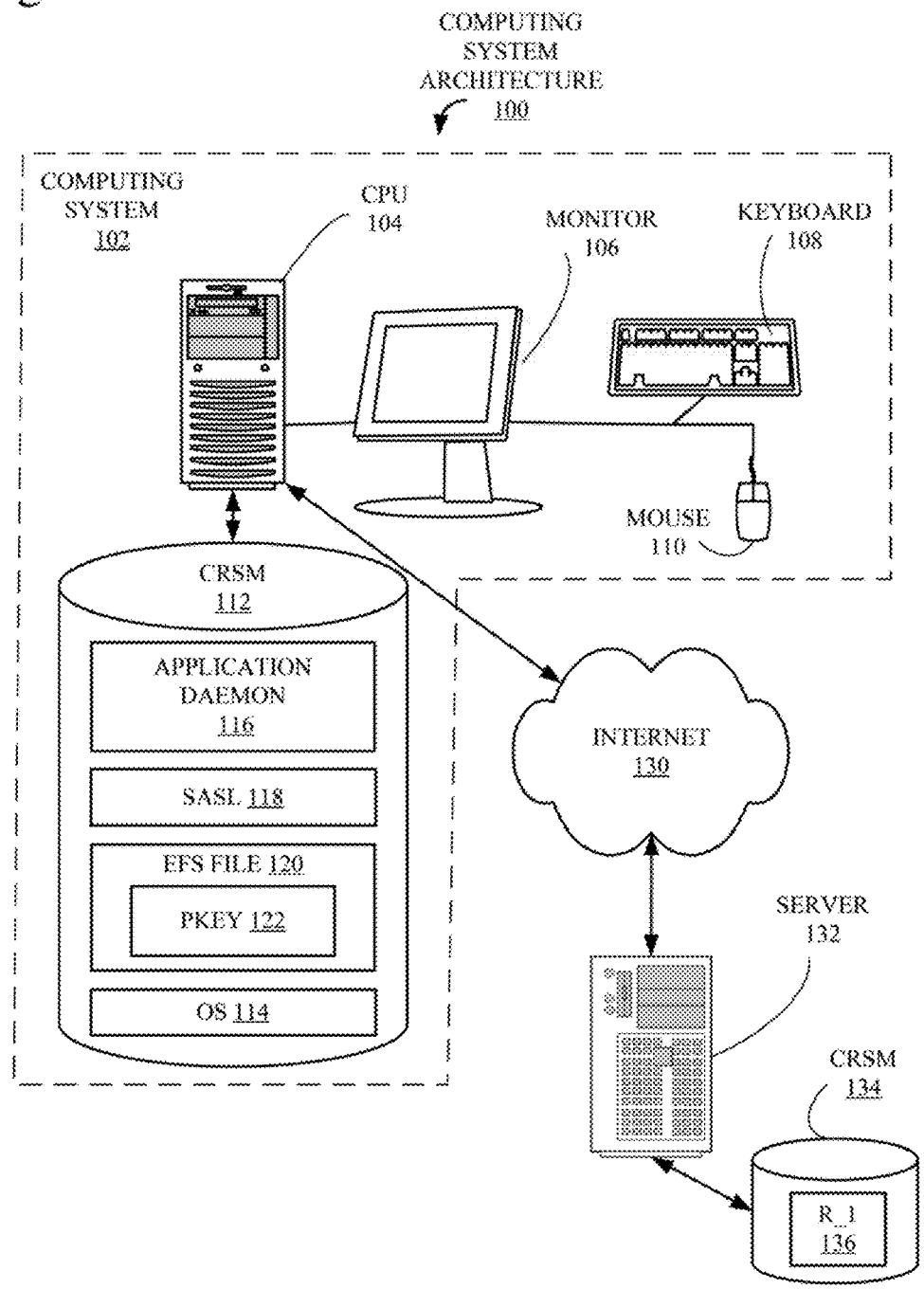
FIG. 1 is one example of a computing system architecture on which the claimed subject matter may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the disclosed technology is applicable to many types of applications and resources, the following description employs a database application and the protected data which the application accesses for the purposes of illustration. Another example used above was LDAP clients and servers. Those with skill in the relevant arts should appreciate the many scenarios in which the claimed subject matter may be employed.

As the Inventors herein have realized, many users with application such as DB2, a database management system (DBMS) produced by International Business Machines Corporation of Armonk, N.Y., have a compliance requirement to encrypt the data. Current systems often store passwords in an Encrypted File Systems (EFS) file so that a DB2 daemon can boot or restart without operator intervention. This requirement is typical in business critical computer systems and applications. However, storing passwords in a file is inherently insecure unless the file is protected with strong encryption. The disclosed techniques provide an additional layer of security.

Turning now to the figures, FIG. 1 is one example of a computing system architecture 100 on which the claimed subject matter may be implemented. A computing system 102 includes a central processing unit (CPU) 104, coupled to a monitor 106, a keyboard 108 and a pointing device, or "mouse," 110, which together facilitate human interaction with computing system 102 and other components of computing system architecture 100. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown). CRSM 112 is illustrated storing an operating system (OS) 114, an example of an application daemon 116, which in this example is a DB2 daemon, a secure application startup loader (SASL) 118 and an encrypted file system (EFS) 120 which includes a key, or "PKey," 122, protected in accordance with the claimed subject matter. Components 116, 118, 120 and 122 and their interaction are described in more detail below in conjunction with FIGS. 2-5.

Computing system 102 and CPU 104 are connected to the Internet 130, which is also connected to a server computer 132. Although in this example, computing system 102 and server 132 are communicatively coupled via the Internet 130, they could also be coupled through any number of communication mediums such as, but not limited to, a local area network (LAN) (not shown). Attach to server 132 is a CRSM 134 illustrated storing a resource, R_1 136, which in this example corresponds to data stored and accessed by DB2 daemon 116. It should be noted there are many possible computing system configurations, of which computing system architecture 100 is only one simple example and that R_1 136 is just one example of a resource that may be protected in accordance with the claimed subject matter. Other examples of protected resources might be, but are not limited to, access to an encrypted network communication protocol and access to a secure LDAP server.

Figure 2:
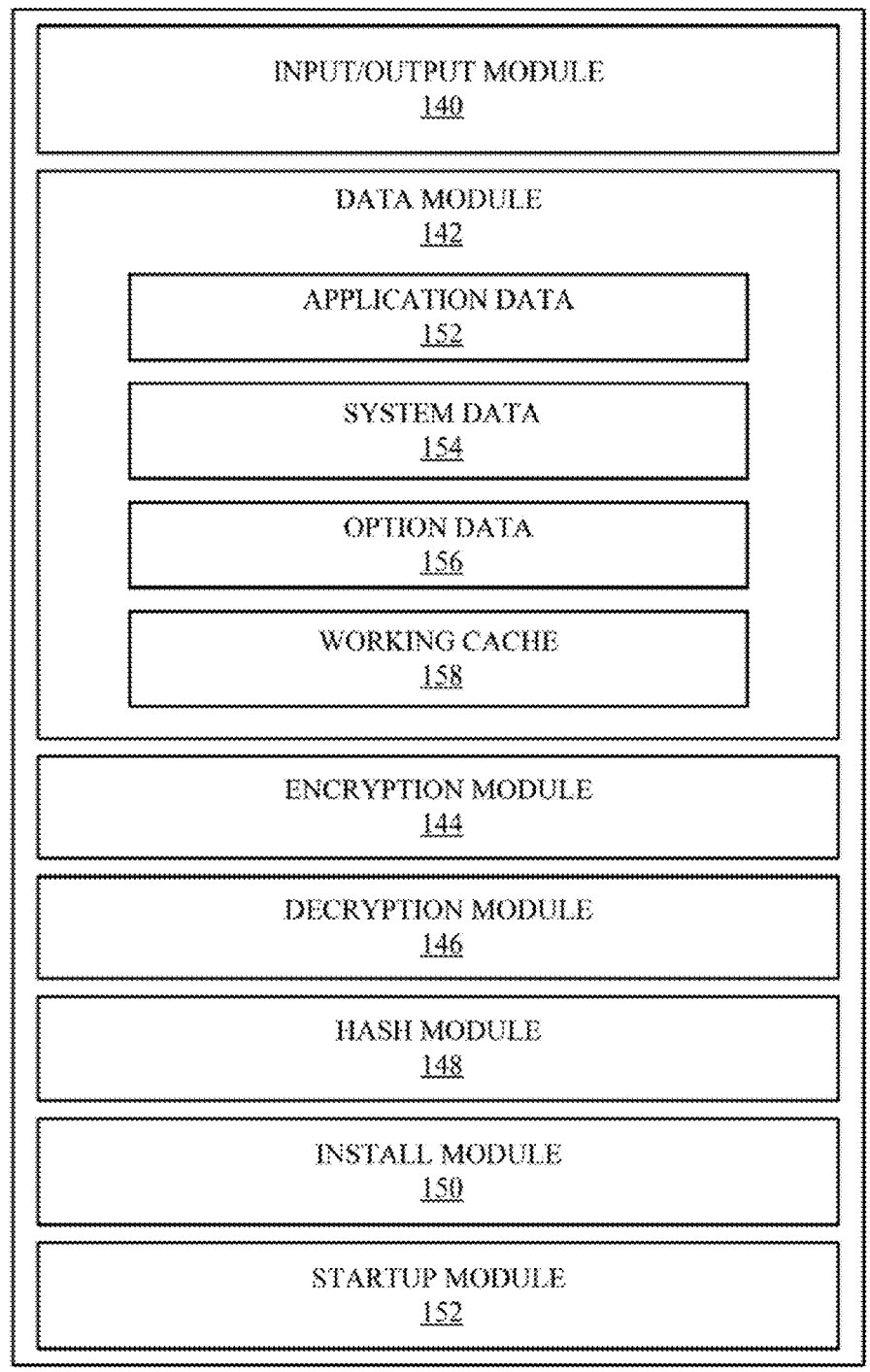
FIG. 2 is a block diagram of a secure application startup loader (SASL) first introduced in FIG. 1.

FIG. 2 is a block diagram of SASL 118, first introduced in FIG. 1, in more detail. SASL 118 includes an input/output (I/O) module 140, a data module 142, an encryption module 144, a decryption module 146, a hash module 148, an install module 150 and a startup module 152. For the sake of the following examples, logic associated with SASL 118 is assumed to execute on computing system 102 (FIG. 1) and stored in CRSM 112 (FIG. 1). It should be understood that the claimed subject matter can be implemented in many types of computing systems and data storage structures but, for the sake of simplicity, is described only in terms of computing system 102 and system architecture 100 (FIG. 1). Further, the representation of SASL 118 in FIG. 2 is a logical model. In other words, components 140, 142, 144, 146, 148, 150 and 152 may be stored in the same or separates files and loaded and/or executed within system 100 either as a single system or as separate processes interacting via any available inter process communication (IPC) techniques.

I/O module 140 handles communication SASL 118 has with other components of computing system 102 and architecture 100. Data module 142 is a data repository for information that SASL 118 requires during normal operation. Examples of the types of information stored in data module 142 include application data 152, system data 154, option data 156 and a working cache 158. Application data 152 stores information about potential application such as name, resources accessed and the location of resources to be accessed. In the following example, application data 152 stores information about application daemon 116 (FIG. 1), R_1 136 (FIG. 1) and the fact that R_1 136 is accessed via server 132 (FIG. 1). System data 154 stores information abut other components of architecture 100. For example, system data 154 may include data to facilitate communication with server 132. Option data 156 includes information on various user and administrative preferences. Working cache 158 stores the results of ongoing calculations.

Encryption module 144, using standard encryption techniques, password protects various data elements for SASL 118. The data encryption function is represented by the following formula: PD (protected data)=encrypt (key, data). Decryption module 146 decrypts previously protected data. Data decryption is represented by the following formula: Data=decrypt (key, PD). Hash module 148 generated hash codes that are employed by encryption and decryption modules 144 and 146 to encrypt and decrypt data, specifically keys to various resources such as R_1 136.

Figure 3:
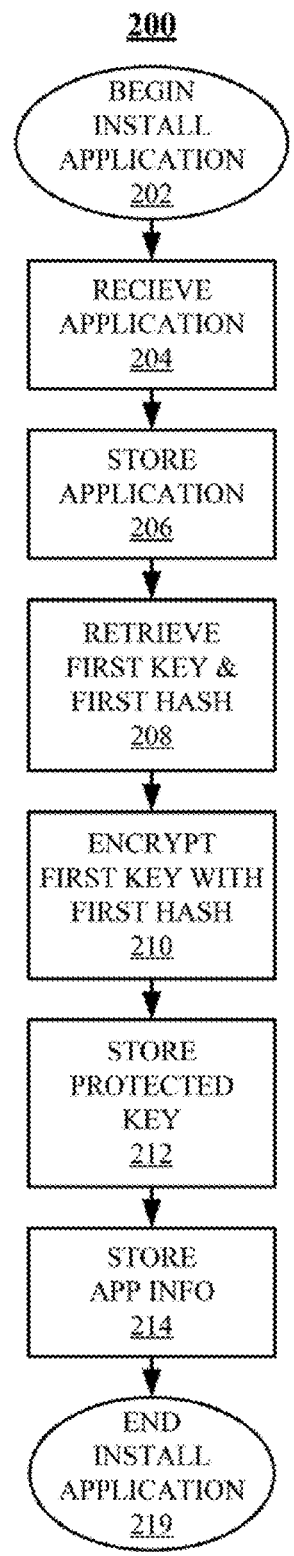
FIG. 3 is a flowchart of an Install Application process that may implement aspects of the claimed subject matter.

Install module 150 facilitates the installation of applications on, in this example, computing system 102 (see 200, FIG. 3). Startup module 152 is responsible for the automatic execution of application daemons on computing system 102 (see 240, FIG. 4). As illustrated below in conjunction with FIG. 4, some applications may be started as in any typical system. Other applications, such as application daemon 116 that access protected resources are loaded in accordance with the disclosed technology. A determination of whether an application is loaded in a typical fashion or in accordance with the claimed subject matter is made based on information stored in application data 152. The functions and interactions of modules 140, 142, 144, 146, 148, 150 and 152 are described in more detail below in conjunction with FIGS. 3-4.

FIG. 3 is a flowchart of an Install Application process 200 that may implement aspects of the claimed subject matter. In this example, logic associated with process 200 is stored on CRSM 112 (FIG. 1) in conjunction with SASL 118 (FIGS. 1 and 2) and executed on one or more processors (not shown) of CPU 104 (FIG. 1) and computing system 102 (FIG. 1).

Process 200 starts in a "Begin Install Application" block 202 and proceeds immediately to a "Receive Application" block 204. During processing associated with block 204, application is received for installation on computing system 102. No assumptions are made on how the application is received. In other words, application can be downloaded, received on a portable storage medium (not shown) or received by any other know or yet to be known manner. One with skill in the relevant arts should know of the many different ways in which an application can be received for installation on a computing system.

During processing associated with a "Store Application" block 206, logic associated with an executable version of the application received during processing associated with block 204, which in this example is application daemon 116 (FIG. 1), is stored on CRSM 112. During processing associated with a "Retrieve First Key and First Hash" block 208, an access key corresponding to a resource, which in this example is R_1 136 (FIG. 1), and a hash code, based upon the executable and generated when the application was compiled, is retrieved. The hash code is typically transmitted in conjunction with the application. Typically, an administrator installing the application would have access to this information.

During processing associated with an "Encrypt First Key With First Hash" block 210, a protected key, which in this example is pkey 122 (FIG. 1) is generated in accordance with the following formula: pkey=Encrypt (First hash, First Key). In other words, pkey 122 is generated by encrypting the key to R_1 136 with the hash code generated when application daemon 116 was compiled. During processing associated with a "Store Protected Key" block 212, pkey 122, which was generated during processing associated with block 210, is stored in EFS file 120 (FIG. 1). It should be noted that typically neither the original key for R_1 136 nor the hash code transmitted with application daemon 116 are stored. In this manner, any party loading application daemon 116 onto CPU 104 for execution needs to be able to decrypt pkey 122 to access R_1 136.

During processing associated with as "Store Application (App.) Info" block 214, information about application daemon 116 is stored in application data 152, including but not limited to, data that enables SASL 118 to correlate application daemon 116 with pkey 122 and an indication that application daemon 116 is protected in accordance with the claimed subject matter. Finally, control proceeds to an "End Install Application" block 219 during which process 200 is complete.

Figure 4:
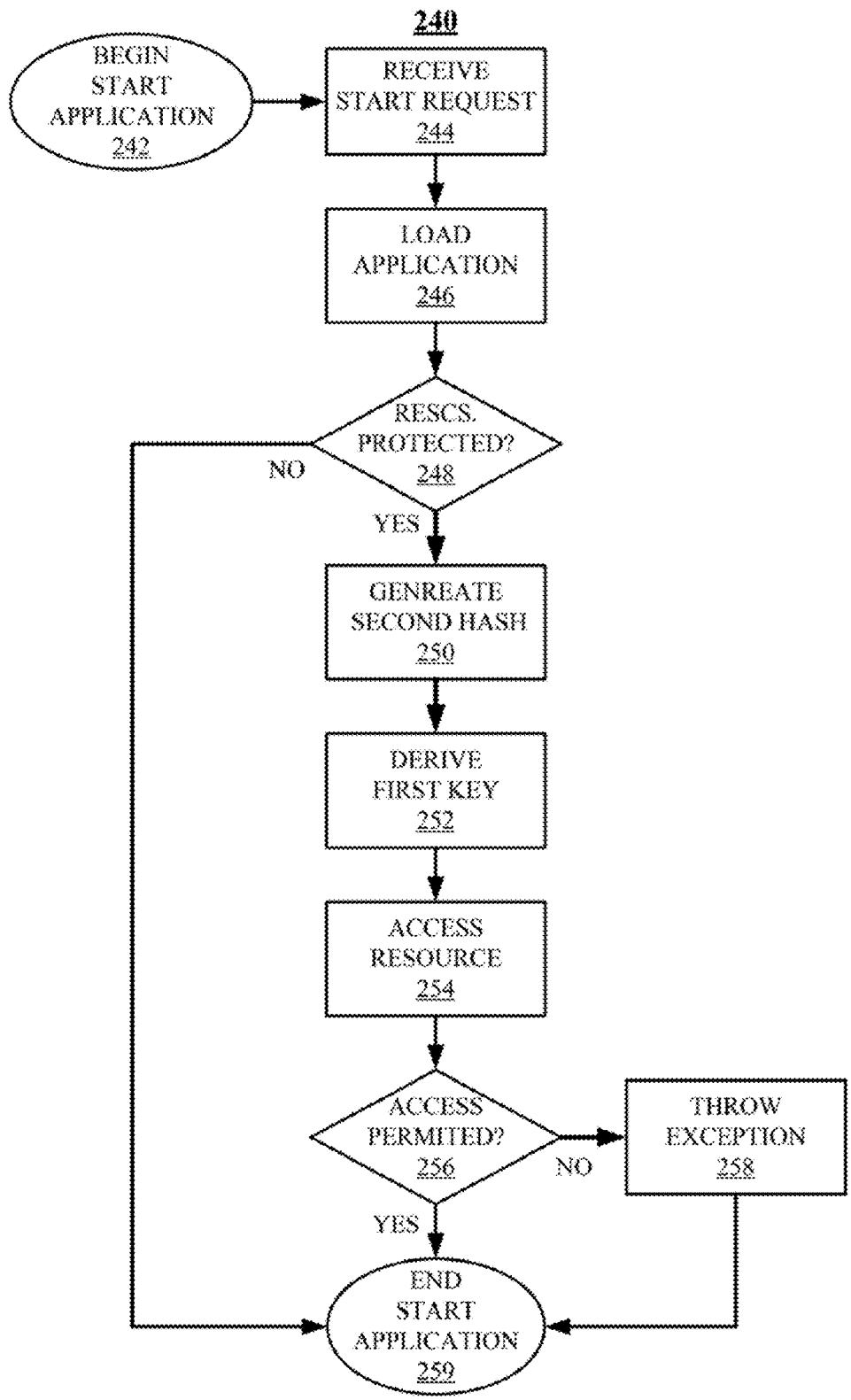
FIG. 4 is a flowchart of a Start Application process that may implement aspects of the claimed subject matter.

FIG. 4 is a flowchart of a Start Application process 240 that may implement aspects of the claimed subject matter. In this example, logic associated with process 240 is stored on CRSM 112 (FIG. 1) in conjunction with SASL 118 (FIGS. 1 and 2) and executed on one or more processors (not shown) of CPU 104 (FIG. 1) and computing system 102 (FIG. 1). Process 240 may be initiated after a reboot or auto-reboot of computing system 102 or after some event that has caused a previously initiated executable of application daemon 116 (FIG. 1) to halt, either intentionally or unintentionally. In general, process 240 prevents the necessity of manual intervention when application daemon 116 is initiated and, more specifically, eliminates the need for an operator to enter a password so that the application can be started with access to necessary encrypted data files and resources. In addition, the disclosed technology eliminates the need for unprotected keys to such necessary files and resources to be stored in the system.

Process 240 starts in a "Begin Start Application" block 242 and proceeds immediately to a "Receive Start Request" block 244. During processing associated with block 244, a request to start an application, which in this example is application daemon 116, is received. As explained above, such a request may be automatically generated by computing system 102 in the event of a reboot or the detection that a previously initiated copy of application daemon 116 has halted. During processing associated with a "Load Application" block 246, application daemon 116 is loaded onto CPU 104 for execution.

During processing associated with a "Resource (Rescs.) Protected?" block 248, a determination is made as to whether or not application daemon 116 requires access to encrypted files or resources in accordance with the claimed subject matter. Such a determination is made based upon information stored in conjunction with application data 152 (FIG. 2). If a determination is made that application daemon 116 requires access to encrypted files or resources in accordance with the claimed subject matter, control proceeds to a "Generate Second Flash Key" block 250. During processing associated with block 250, a second hash code (SH) is generated (see 148, FIG. 2) based upon the image of application daemon 116 loaded during processing associated with block 246.

During processing associated with a "Derive First Key" block 252, the hash code generated during processing associated with block 250 is used as a key to decrypt (see 146, FIG. 2) pkey 122 (see 210, 212, FIG. 3) to generate a second key (SK) based upon the following formula: SK=decrypt (pkey 122). During processing associated with an "Access Resource" block 254, the second key generated during processing associated with block 252 is employed to access R_1 136. It should be noted that if the second hash code matches the first hash code (see 208, FIG. 3) pkey 122 is able to be decrypted to produce the original key (see 208, FIG. 3) to the corresponding protected files or resources. It should also be noted that if application daemon 116 has been modified the second hash code will not match the first hash code and the decryption during processing associated with block 252 will not produce the correct key to the encrypted file or resource.

During processing associated with an "Access Permitted?" block 256, a determination is made as to whether or not the protected files or resource have been able to be accessed. If not, control proceeds to a "Throw Exception" block 258. During processing associated with block 258, appropriate action is taken. Such action may include, but is not limited to, transmittal of a notification to an administrator of computing system 102 or application daemon 116. Finally, once a determination has been made that protected files or resources are not involved during processing associated with block 248, once a determination has been made that access has been permitted during processing associated with block 256 or an exception has been thrown during processing associated with block 258, control proceeds to an "End Start Application" block 259 during which process 240 are complete.

The terminology used herein is for the purpose of describing particular embodiments only and is not intended to be limiting of the invention. As used herein, the singular thrills "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:
1. A method, comprising:
   encrypting a resource associated with an application with a first key;
   generating, at an install time of the application, a first hash code for an executable daemon associated with the application;
   encrypting the first key with the first hash code to produce a protected first key;
   generating, at a load time of an application, a second hash code for the executable daemon;
   deriving the first key by decrypting the protected first key using the second hash code to produce a derived first key; and
   accessing the resource by the executable daemon by employing the derived first key.

2. The method of claim 1, further comprising storing the protected first key in an Encrypted File Systems (EFS) file.

3. The method of claim 1, further comprising:
   comparing the first hash code to the second hash code; and
   preventing a loading of the application in response to a mismatch between the first hash code and the second hash code.

4. The method of claim 1, wherein the application is a database server and the resource is a password protected database.

5. The method of claim 1, wherein the resource is a password protected network communication device.

6. The method of claim 1, wherein the resource is a lightweight directory access protocol (LDAP) server.

7. The method of claim 1, further comprising:
   detecting that as shutdown of the application has occurred; and
   initiating the generating of the second hash code, the deriving of the first key, and the accessing of the resource in response to the detecting.

8. An apparatus, comprising:
   a processor;
   a computer-readable storage device; and
   logic, stored on the computer-readable medium and executed on the processor, for:
      encrypting a resource associated with an application with a first key;
      generating, at an install time of the application, a first hash code for an executable daemon associated with the application;
      encrypting the first key with the first hash code to produce a protected first key;
      generating, at a load time of an application, a second hash code for the executable daemon;
      deriving the first key by decrypting the protected first key using the second hash code to produce a derived first key; and
      accessing the resource by the executable daemon by employing the derived first key.

9. The apparatus of claim 8, the logic further comprising logic for storing the protected first key in an Encrypted File Systems (EFS) file.

10. The apparatus of claim 8, the logic further comprising logic for:
    comparing the first hash code to the second hash code; and
    preventing a loading of the application in response to a mismatch between the first hash code and the second hash code.

11. The apparatus of claim 8, wherein the application is a database server and the resource is a password protected database.

12. The apparatus of claim 8, wherein the resource is a password protected network communication device.

13. The apparatus of claim 8, the logic further comprising logic for:
    detecting that a shutdown of the application has occurred; and initiating the generating of the second hash code, the deriving of the first key, and the accessing of the resource in response to the detecting.

14. A computer programming product, comprising:
a computer-readable storage device; and
logic, stored on the computer-readable medium for execution on a processor, for:
    encrypting a resource associated with an application with a first key;
    generating, at an install time of the application, a first hash code for an executable daemon associated with the application;
    encrypting the first key with the first hash code to produce a protected first key;
    generating, at a load time of an application, a second hash code for the executable daemon;
    deriving the first key by decrypting the protected first key using the second hash code to produce a derived first key; and
    accessing the resource by the executable daemon by employing the derived first key.

15. The computer programming product of claim 14, the logic further comprising logic for storing the protected first key in an Encrypted File Systems (EFS) file.

16. The computer programming product of claim 14, the logic further comprising logic for:
    comparing the first hash code to the second hash code; and
    preventing a loading of the application in response to a mismatch between the first hash code and the second hash code.

17. The computer programming product of claim 14, wherein the application is a database server and the resource is a password protected database.

18. The computer programming product of claim 14, wherein the resource is a password protected network communication device.

19. The computer programming product of claim 14, the logic further comprising logic for:
    detecting that a shutdown of the application has occurred; and
    initiating the generating of the second hash code, the deriving of the first key, and the accessing of the resource in response to the detecting.

20. An automated application startup device, comprising:
a processor;
a computer-readable storage device coupled to the processor; and
logic, stored on the computer-readable medium and executed on the processor, for:
    encrypting a resource associated with an application with a first key;
    generating, at an install time of the application, a first hash code for an executable daemon associated with the application;
    encrypting the first key with the first hash code to produce a protected first key;
    generating, at a load time of an application, a second hash code for the executable daemon;
    deriving the first key by decrypting the protected first key using the second hash code to produce a derived first key; and
    accessing the resource by the executable daemon by employing the derived first key.

21. The automated application startup device of claim 20, the logic further comprising logic for storing the protected first key in an Encrypted File Systems (EFS) file.

22. The automated application startup device of claim 20, the logic further comprising logic for:
    comparing the first hash code to the second hash code; and
    preventing a loading of the application in response to a mismatch between the first hash code and the second hash code.

23. The automated application startup device of claim 20, wherein the application is a database server and the resource is a password protected database.

24. The automated application startup device of claim 20, wherein the resource is a password protected network communication device.

25. The automated application startup device of claim 20, the logic further comprising logic for:
    detecting that a shutdown of the application has occurred; and
    initiating, the generating of the second hash code, the deriving of the first key, and the accessing of the resource in response to the detecting.

* * * * *